(12) United States Patent
Carr (10) Patent No.: US 10,006,501 B2
(45) Date of Patent: Jun. 26, 2018

(54) CLUTCH ACTUATION DEVICE (71) Applicant: SCHAEFFLER TECHNOLOGIES AG & CO. KG, Herzogenaurach (DE)

(72) Inventor: Stephen Carr, Troy, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 243 days.

(21) Appl. No.: 14/963,748

(22) Filed: Dec. 9, 2015

(65) Prior Publication Data
US 2017/0167547 A1    Jun. 15, 2017

(51) Int. Cl.
*F16D 23/12*    (2006.01)
*F16D 27/115*   (2006.01)

(52) U.S. Cl.
CPC .......... *F16D 23/12* (2013.01); *F16D 27/115* (2013.01); *F16D 2023/123* (2013.01)

(58) Field of Classification Search
CPC ... F16D 23/12; F16D 2023/123; F16D 27/115
See application file for complete search history.

(56) References Cited

U.S. PATENT DOCUMENTS

| | | | |
|---|---|---|---|
| 2,820,440 A | 1/1958 | Jacobs | |
| 3,952,843 A * | 4/1976 | Campbell | F16D 55/14 188/71.4 |
| 4,645,047 A * | 2/1987 | Adolfsson | B60K 17/3505 192/12 B |
| RE36,502 E * | 1/2000 | Organek | F16D 23/12 192/35 |
| 6,454,068 B2 | 9/2002 | Arai et al. | |
| 6,666,315 B2 | 12/2003 | Organek et al. | |
| 6,874,605 B2 * | 4/2005 | Kwoka | F16D 27/10 192/48.3 |
| 8,738,256 B2 | 5/2014 | Connolly et al. | |
| 2002/0142877 A1 | 10/2002 | Williams et al. | |
| 2003/0221927 A1 * | 12/2003 | Showalter | F16D 27/115 192/35 |
| 2009/0145718 A1 * | 6/2009 | Chiesa | F16D 41/12 192/41 A |
| 2012/0097496 A1 | 4/2012 | Greene | |
| 2012/0103743 A1 | 5/2012 | Hong | |
| 2012/0161400 A1 | 6/2012 | George | |
| 2016/0298705 A1 * | 10/2016 | Davies | F16D 43/215 |

* cited by examiner

*Primary Examiner* — Ramya P Burgess
*Assistant Examiner* — Lillian T Nguyen
(74) *Attorney, Agent, or Firm* — Brooks Kushman P.C.

(57) ABSTRACT

A clutch actuation device includes two plates that can selectively extend and compress relative to one another to selectively engage or disengage a clutch. Each plate includes a plurality of grooves, each groove having a deep end portion, a shallow end portion, and a ramped or inclined surface between the end portions. Each groove on the first plate corresponds with a respective groove on the second plate to define a plurality of pockets. Within each pocket is an elongated member having a pair of curved ends and an elongated shaft therebetween. The curved ends sit in the deep end portions of the grooves. To extend the plates relative to one another, the first plate is rotated relative to the second plate. This causes the curved ends of the elongated members to pivot within the deep end portions, and the elongated shaft extends away from the ramped surface, separating the plates.

19 Claims, 5 Drawing Sheets

CLUTCH ACTUATION DEVICE

TECHNICAL FIELD

The present disclosure relates to an actuation device for engaging and disengaging a clutch in a vehicle.

BACKGROUND

Clutches selectively couple two rotating elements within a vehicle. Clutch actuation devices are known in the art for selectively engaging and disengaging the clutch. For example, when torque is needed to be transmitted through the clutch, the actuation device applies a load to an actuator plate which locks up clutch discs within the clutch housing.

SUMMARY

In one embodiment, a clutch actuation device comprises a first plate, a second plate, and first and second elongated members between the plates. The first plate defines first and second ramped grooves spaced apart from each other. The second plate is coupled to the first plate and also defines first and second ramped grooves spaced apart from each other. The first ramped grooves of the first and second plates overlap each other to form a first pocket. The second ramped grooves of the first and second plates overlap each other to form a second pocket. The first and second elongated members are disposed in the first and second pockets, respectively. Each of the elongated members has first and second curved ends and an elongated shaft extending therebetween.

Each of the first and second ramped grooves may include a deep end portion, a shallow end portion, and a ramped surface therebetween. The first and second plates may be configured to be spaced apart from each other in a compressed state and an extended state. The elongated shaft of the first elongated member may be parallel to the ramped surfaces of the first ramped grooves when the first and second plates are in the compressed state, and may be transverse to the ramped surfaces of the first ramped grooves when the first and second plates are in the extended state.

The ramped surfaces of the first ramped grooves may be selectively spaced apart from each other by a first distance in the compressed state and a second distance in the extended state. The second distance may be greater than the first distance.

The first ramped grooves may be situated with respect to each other in a first rotational configuration in the compressed state and a second rotational configuration in the extended state, and the first and second rotational configurations may be offset from each other by an offset angle.

In another embodiment, a clutch actuation device includes a first plate, a second plate, and a plurality of elongated members disposed between the plates. The first plate defines a first plurality of ramped grooves spaced apart from one another, with each ramped groove having a deep end portion, a shallow end portion, and a ramped surface therebetween. The second plate is coupled to the first plate and defines a second plurality of ramped grooves spaced apart from one another, with each ramped groove having a deep end portion, a shallow end portion, and a ramped surface therebetween. The first and second plates are selectively spaced apart from each other in a compressed state and an extended state. The elongated members each contact at least one of the deep end portions of the first plurality of ramped grooves and one of the deep end portions of the second plurality of ramped grooves while the first and second plates are in both the compressed and extended states.

In yet another embodiment, a clutch actuation device comprises a first plate and a second plate. The first plate defines a plurality of first grooves spaced apart from one another. Each of the plurality of first grooves includes a first ramped groove having a deep end portion, a shallow end portion, and a ramped surface therebetween. The second plate defines a plurality of second grooves spaced apart from one another. Each of the plurality of second grooves includes a second ramped groove having a deep end portion, a shallow end portion, and a ramped surface therebetween. Each of the plurality of second grooves corresponds to one of the first grooves to form a pair of ramped grooves. Each pair of ramped grooves generally overlaps to define a pocket. For each of the pockets, the deep end portion of the first ramped groove is aligned closer to the shallow end portion of the second ramped groove than the deep end portion of the second ramped groove.

For each of the pockets, the first ramped groove may be situated with respect to the second ramped groove in (i) a first rotational configuration when the first and second plates are in the compressed state, and (ii) a second rotational configuration when the first and second plates are in the extended state.

For each of the pockets, the deep end portion of the first ramped groove may be separated from the deep end portion of the second ramped groove (i) by a first distance when the first and second plates are in the compressed state and (ii) by a second distance when the first and second plates are in the extended state, and the second distance is less than the first distance.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Clutches selectively couple two rotating elements within a vehicle. Clutch actuation devices are known in the art for selectively engaging and disengaging the clutch. For example, when torque is needed to be transmitted through the clutch, the actuation device applies a load to an actuator plate which locks up clutch discs within the clutch housing.

One type of clutch actuation device includes a hydraulic piston, in which hydraulic pressure is applied to a piston to close and open the clutch.

Another type of clutch actuation device is known as a "ball ramp" device. A spherical ball is disposed between two engaging plates, and nests within an inclined groove of one or both engaging plates. The ball translates along the inclined groove to selectively separate one of the plates from the other.

Figure 1:
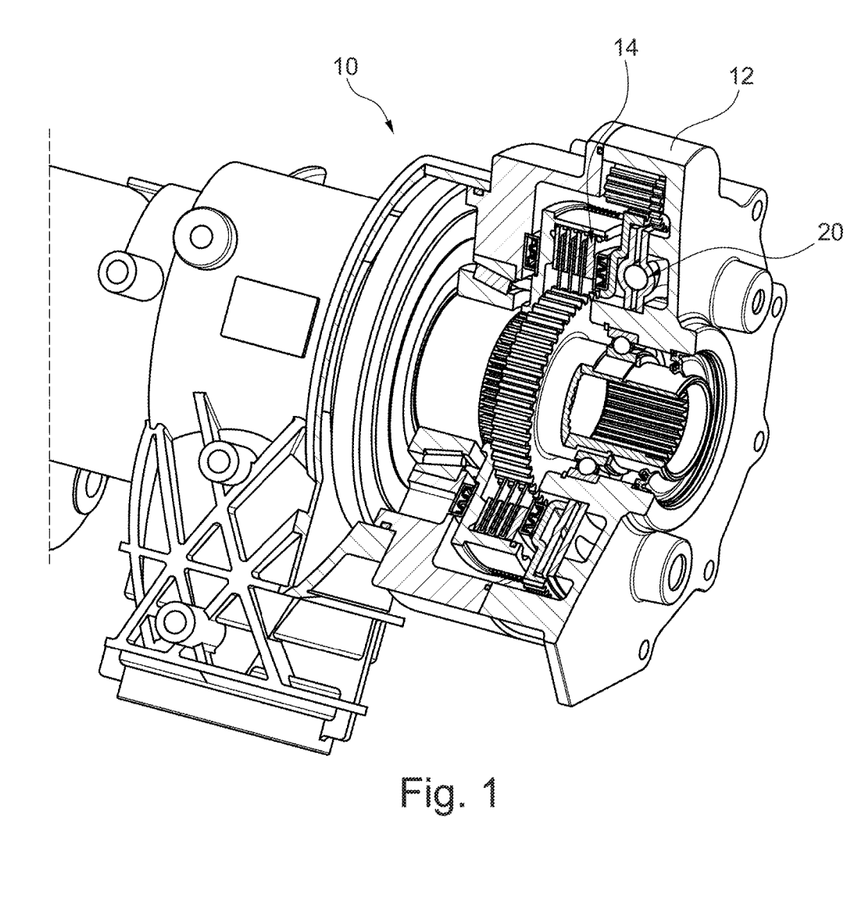
FIG. 1 is a sectional perspective view of a clutch device according to one embodiment.

FIG. 1 illustrates a clutch device 10 for selectively transmitting torque therethrough. The clutch device 10 can be part of an automatic all-wheel drive (AWD) activation system, for example. In such an AWD setting, the clutch device 10 selectively transfers torque to a drive axle when, for example, it is detected that a wheel is slipping. The clutch device 10 includes a casing 12 having a multiplate clutch pack 14 disposed therein. The clutch pack 14 is controlled to selectively compress in order to allow torque to transfer therethrough and to the drive axle. Also within the casing 12 is a clutch actuation device 20 which, as will be described below, separates and compresses to selectively engage the clutch pack 12.

The specific structure of FIG. 1 is not meant to be limiting, but is provided to give exemplary structural context for the clutch actuation device 20, which is described in detail below.

Figure 2:
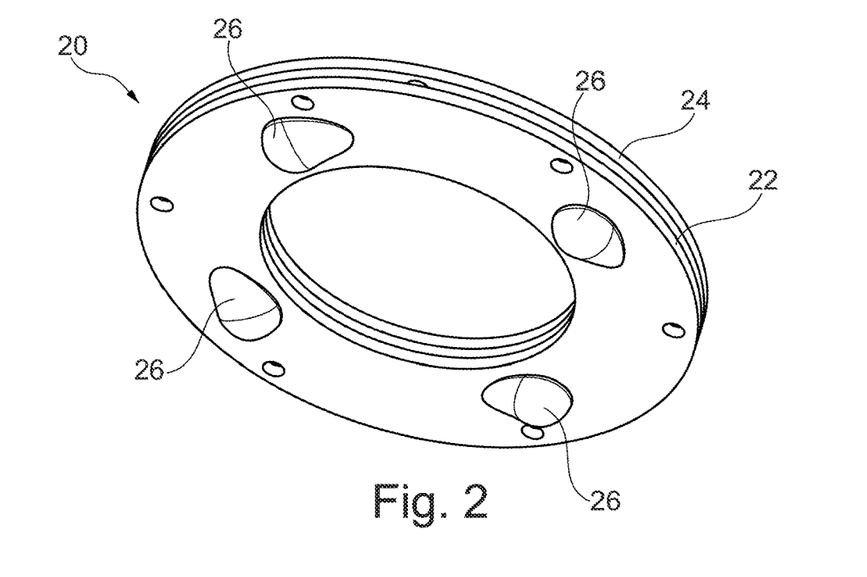
FIG. 2 is a perspective view of a clutch actuation device in a compressed state, according to one embodiment.
Figure 3:
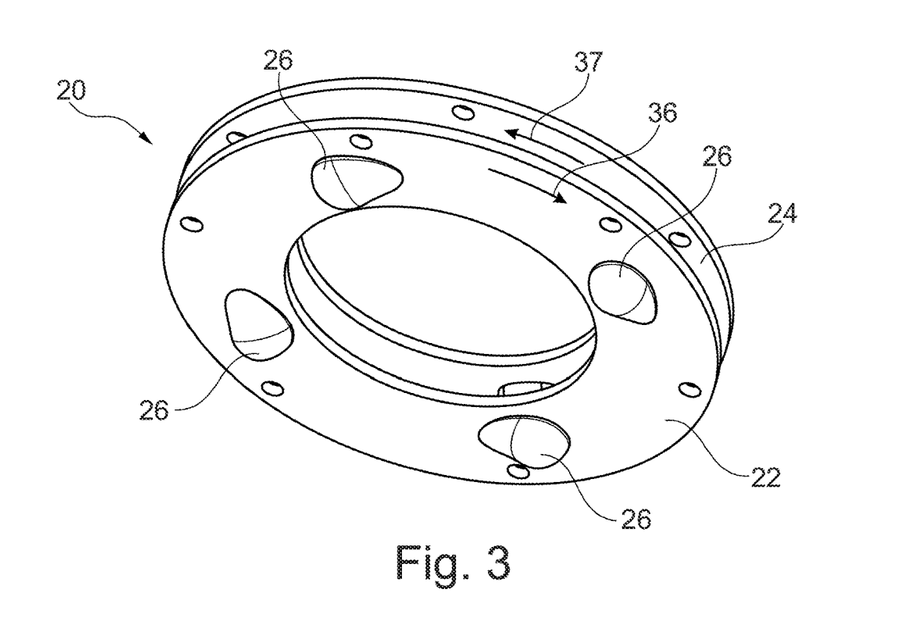
FIG. 3 is a perspective view of the clutch actuation device in an extended state, according to one embodiment.
Figure 4:
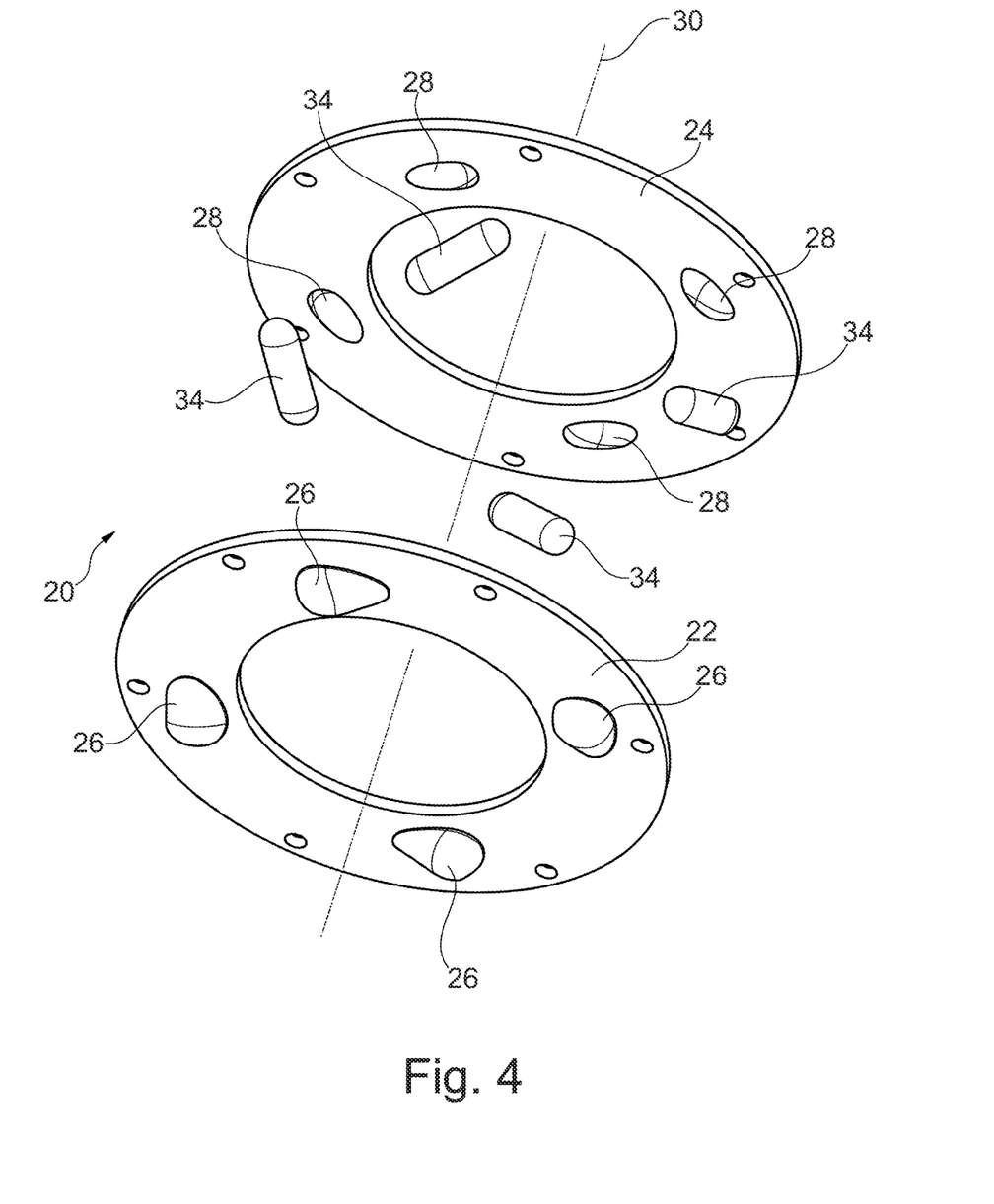
FIG. 4 is an exploded perspective view of the clutch actuation device of FIGS. 2 and 3.

FIGS. 2-4 illustrate various perspective views of the clutch actuation device 20. The clutch actuation device 20 is part of a clutch within a vehicle and selectively "engages" and "disengages" the clutch; when the clutch actuation device 20 is "engaged," the clutch is correspondingly engaged, and when the clutch actuation device 20 is "disengaged," the clutch is correspondingly disengaged.

The clutch actuation device 20 includes a first plate 22 and a second plate 24 coupled to each other. The clutch actuation device 20 is configures to translate between a compressed state (shown in FIG. 2) and an extended state (shown in FIG. 3). In one embodiment, the corresponding clutch is engaged when clutch actuation device 20 is in the extended state, and is disengaged when the clutch actuation device 20 is in the compressed state.

The first plate 22 includes a first plurality of grooves 26 defined on a surface that faces the second plate 24. As shown in FIG. 4, the second plate 24 includes a corresponding second plurality of grooves 28 defined on a surface that faces the first plate 22. In one embodiment, the first grooves 26 on the first plate 22 are circumferentially spaced about a central axis 30. The second grooves 28 on the second plate 24 are also annularly spaced about the central axis 30, with each of the second grooves 28 generally aligning with one of the first grooves 26.

Each pair of aligned grooves 26, 28 defines a receptacle or pocket configured to receive an elongated member 34. Each elongated member 34 is disposed between the first and second plates, 22, 24 within one of the pockets. The elongated members 34 pivot and rotate within the pockets, and change their orientation with respect to the plates 22, 24 in order to maintain the plates in either the compressed state or the extended state.

To translate from the compressed state (FIG. 2) to the extended state (FIG. 3), a rotational force is provided onto the first plate 22 and/or the second plate 24. To provide the rotational force, an electromagnetic actuator can be activated to apply force 36 and/or 37 to an armature to rotate plates 22 and/or 24 relative to each other. From the view shown in FIGS. 2 and 3, a clockwise force is placed on the first plate 22 to rotate it clockwise relative to the second plate 24 and/or a counter-clockwise force is placed on the second plate 24 to rotate it counter-clockwise relative to the first plate 22. While the first plate 22 rotates clockwise relative to the second plate 24 or the second plate rotates counter-clockwise relative to the first plate 22, the elongated members 34 pivot within the grooves 26, 28 to extend the first and second plates 22, 24 away from each other. This engages the corresponding clutch coupled to the clutch actuation device 20. To disengage the clutch, a force can be applied from the opposite electromagnetic actuator to the plates 22, 24 in the opposite direction (i.e., counter-clockwise to plate 22 or clockwise to plate 24 in FIG. 3).

FIGS. 5 and 5A-5C illustrate various views of the clutch actuation device 20 in the compressed state. FIGS. 6 and 6A-6C illustrate various views of the clutch actuation device 20 in the extended state.

Figure 5:
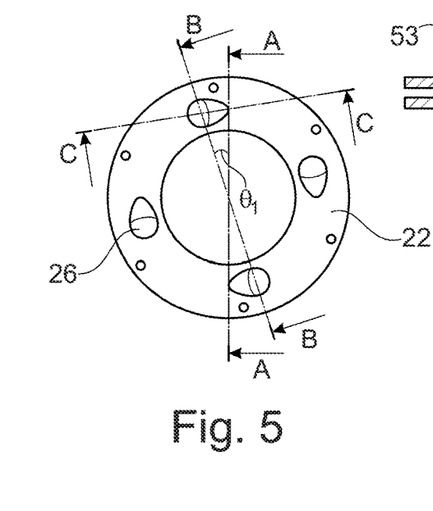
FIG. 5 is a bottom plan view of the clutch actuation device in the compressed state.
Figure 5A:
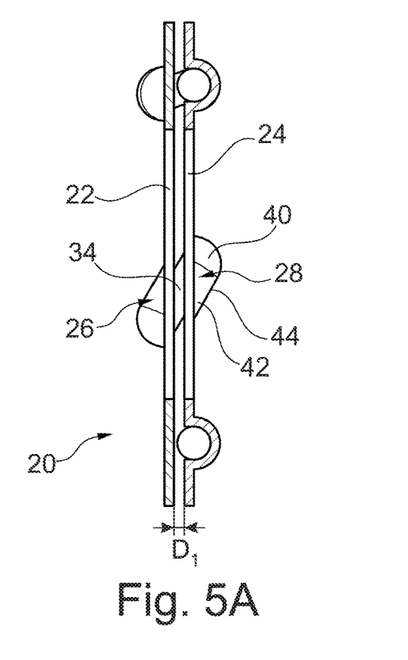
FIGS. 5A, 5B, and 5C are cross-sectional views taken along lines A-A, B-B, and C-C of FIG. 5, respectively.
Figure 5B:
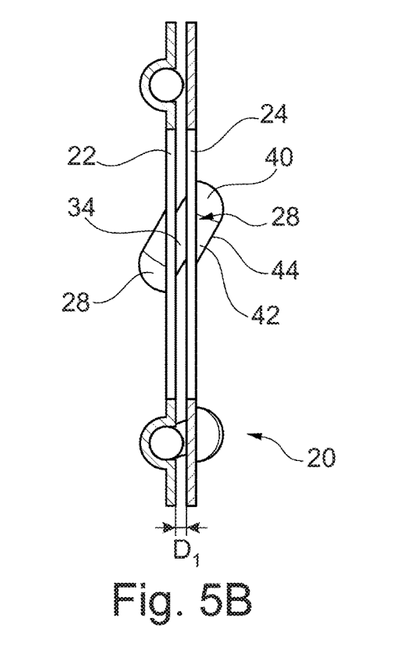
Figure 6:
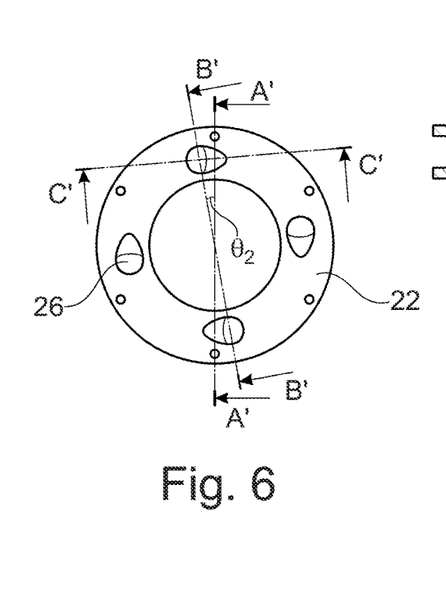
FIG. 6 is a bottom plan view of the clutch actuation device in the extended state.
Figure 6A:
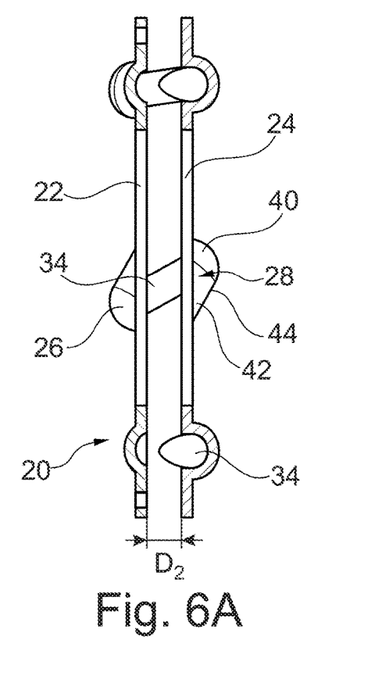
FIGS. 6A, 6B, and 6C are cross-sectional views taken along lines A'-A', B'-B', and C'-C' of FIG. 6, respectively.
Figure 6B:
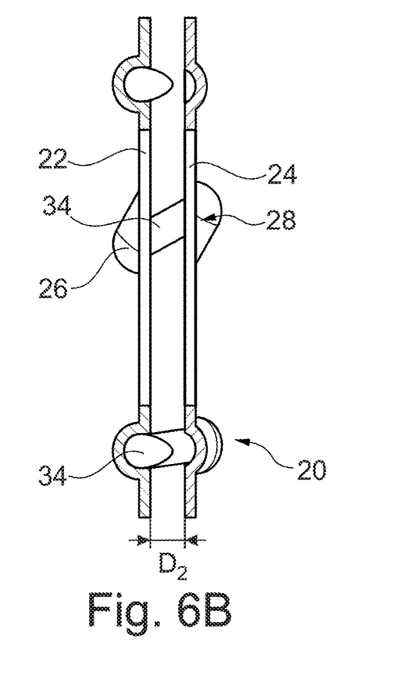
Figure 6C:
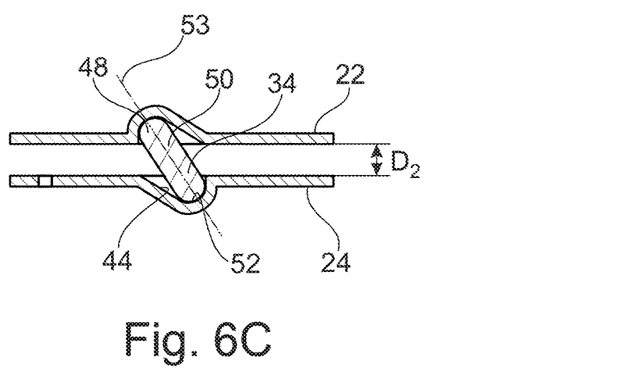

Referring to FIG. 5, a bottom plan view of the first clutch plate 22 of the clutch actuation device 20. A cross-sectional line A-A is taken along a vertical direction from the top of the first clutch plate 22 to the bottom in the view shown in FIG. 5. A second cross-sectional line B-B is taken between the deep portions of two grooves 26. A first angle $\theta_1$ exists between the lines A-A and B-B. As explained above, in order to translate from the compressed state to the extended state, the first plate 22 rotates relative to the second plate 24. As can be seen in FIG. 6, the angle between lines A-A and B-B has reduced to a second angle $\theta_2$. The difference between the angles $\theta_1$ and $\theta_2$ represents an offset angle that the first plate rotates relative to the second plate between the compressed and extended states.

First referring to the compressed state illustrated in FIGS. 5 and 5A-5C, the first plate 22 and the second plate 24 are separated by a first distance $D_1$. Each elongated member 34 rests within a pocket defined by one of the first grooves 26 of the first plate 22 that overlaps with one of the second grooves 28 of the second plate 24. Each of the grooves 26, 28 is inclined such that they include a deep end portion 40 and a shallow end portion 42. A ramped surface 44 extends between the deep end portion 40 and the shallow end portion 42 of each of the grooves 26, 28.

Figure 5C:
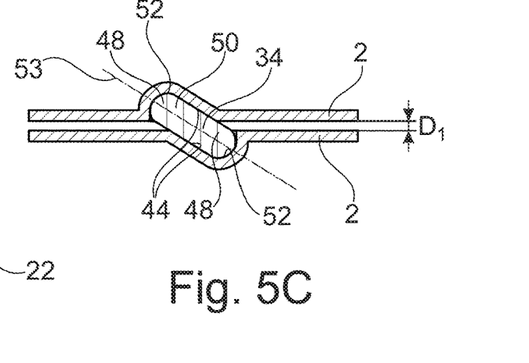

As shown in FIG. 5C, the elongated member 34 includes two opposed curved ends 48 and an elongated shaft 50 extending between the curved ends 48. In one embodiment, when the plates 22, 24 are in the compressed state, the elongated member 34 matches the general profile of the first and second grooves 26, 28. For example, in one embodiment, the curved ends 48 each nest within a corresponding curved surface 52 within the deep end portion 40 of the grooves 26, 28. The curved surface 52 can have a radius of curvature equal to or slightly larger than a radius of curvature of the curved ends 48 of the elongated member 34. This allows the curved ends 48 of the elongated members 34 to have a flush engagement with the curved surfaces 52 while allowing the curved ends 48 to pivot within the deep end portions 40. A longitudinal axis 53 of the elongated shaft 50 is generally parallel or parallel to the ramped surfaces 44 of the grooves 26, 28, when the clutch actuation device is in the compressed state. In one embodiment, the generally parallel configuration is within ±1, ±0.5 or ±0.01 degrees offset between the longitudinal axis 53 and ramped surfaces 44 of the grooves 26, 28. In one embodiment, the elongated shaft 50 is supported by the ramped surfaces 44 of the grooves 26, 28 when the clutch actuation device is in the compressed state.

Referring to the extended state illustrated in FIGS. 6 and 6A-6C, the first plate 22 has rotated relative to the second plate 24, causing a change in alignment between the overlapping first groove 26 and second groove 28. For example, the deep end portion 40 of the first groove 26 has moved toward the deep end portion 40 of the second groove 28. Due to the change in alignment between the overlapping grooves 26, 28, the elongated member 34 is forced to pivot within the deep end portions 40 of the first and second grooves 26, 28. While pivoting, the elongated shaft 50 lifts away and separates from the ramped surfaces 44 of the grooves 26, 28. Said another way, the longitudinal axis of the elongated shaft 50 transitions from being generally parallel with the ramped surfaces 44, to being transverse to the ramped surfaces 44, thereby causing an offset angle between longitudinal axis 53 of the elongated shaft 50 and the ramped surfaces 44 of the grooves 26, 28. In one embodiment, the offset angle is within ±10, ±5 or ±1 degrees offset between the longitudinal axis 53 and ramped surfaces 44 of the grooves 26, 28. This causes the first and second plates 22, 24 to separate to a second distance $D_2$ that exceeds the first distance $D_1$.

It should be understood that the word "transverse" in this disclosure should not be limited to perpendicular. For example, the longitudinal axis 53 of the elongated shaft 50 may extend 45 degrees from a parallel orientation with respect to the ramped surfaces 44 when the clutch actuation device is in its extended state. In this embodiment, the longitudinal axis 53 of the elongated shaft 50 can be considered as being oriented transverse to the ramped surfaces.

A controller (not shown) can be programmed to maintain the clutch actuation device 20 in the compressed state for as long as it is desired that the corresponding clutch remains disengaged. When conditions require the corresponding clutch to be engaged, such as when it is desired to transition into an all-wheel drive mode, the controller commands the electromagnetic actuator to rotate the first plate 22 relative to the second plate 24 to transition the clutch actuation device to the extended state 20. Friction surfaces on the clutch are then able to engage one another such that the clutch can become engaged and torque can transfer through the all-wheel drive mechanism.

In the embodiments described above, the elongated members 34 include two curved ends 48 and an elongated shaft 50 therebetween. It should be understood that the embodiments illustrated in the Figures are merely exemplary and other embodiments are contemplated. For example, the curved ends 48 may be spherical or semi-spherical. One curved end of one elongated member 34 may have a different diameter or radius than the other curved end of the elongated member 34. The elongated shafts 50 may be cylindrical, an I-beam, a T-beam, an L-beam, or a U-beam, or the cross-section of the elongated shaft 50 may take the shape of an ellipse, a square, a rectangular, a polygon. The elongated member 34 may be solid or hollow.

The present disclosure should not be limited to four elongated members 34. More or less than four elongated members can be utilized. For example, in some embodiments with large clutch engagement surfaces or heavy anticipated loads passing through the clutch, it may be beneficial to provide up to thirty-six elongated members in thirty-six corresponding pockets. This can be accomplished by utilizing larger plates, elongated elements with smaller diameter at the curved ends, and/or ramped grooves with shallower deep end portions. In other embodiments with smaller clutch engagement surfaces or lighter anticipated loads, only two or three elongated members may be utilized. Moreover, the grooves 26, 28 that contain the elongated members 34 are not necessarily utilized to be annularly spaced about a central axis 30. For example, depending on the size and configuration of the clutch actuation device 20, some of the grooves 26, 28 may be located radially inward relative to other grooves.

The length of the elongated member may also vary in size. This enables the clutch actuation device 20 to be easily scaled to size to fit a particular vehicle configuration without necessarily changing to tooling required to make the plates 22, 24. For example, if a wider distance D is required for a particular clutch configuration, then elongated members can be used with longer elongated shafts 50 while maintaining the same size or radius of curvature of the curved ends 48. This may be particularly beneficial over traditional ball-ramp clutch actuation devices. In designing such devices, an enlargement of the size of the balls in the ball-ramp devices may result in an enlargement of the corresponding grooves that the balls rest in. In certain instances, tooling changes could result for forming the plates. To further improve scalability of the clutch actuation device 20, the radius or diameter of the curved ends of the elongated members 34 may also be sized accordingly.

In various embodiments, selecting a different length of the elongated members 34 has a direct relationship to the distance D of actuation, e.g., $D_2-D_1$. For example, the actuation distance D can be represented by the following relationship:

$$D = L \times \sin(\theta)$$

where D is the distance of actuation ($D_2-D_1$), L is the length of the elongated member 34, and θ is the change in angular alignment between the plates (e.g., $\theta_2-\theta_1$) between the compressed and extended states. In one embodiment, the actuation distance D is in the range of five to ten units, and in a more particular embodiment, D is between six to nine units. In the embodiment shown in the Figures, the actuation distance D is approximately 7.1 units. In one embodiment, the change in angular alignment between the plates is in the range of two to ten degrees, and in a more specific embodiment, the change in angular alignment between the plates is in the range of three to eight degrees, and more particularly is approximately five degrees.

While not shown in the Figures, it is contemplated that stabilizing mechanisms may be provided to the plates to assist in maintaining the clutch actuation device 20 in the extended state and the compressed state. For example, stoppers can be provided on the plates that prevent over-rotation of either plate in either rotational direction. In another embodiment, the actuator arm used for providing relative rotational movement between the plates can be limited such that it can only rotate the plates by a fixed rotational distance (e.g., between $\theta_1$ and $\theta_2$).

The clutch actuation device described above is, in one embodiment, for an all-wheel drive clutch that selectively engages and disengages all-wheel drive in the vehicle by selectively transferring torque through the device and to wheels. But, this disclosure is not limited to such a device.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A clutch actuation device comprising:
a first plate defining a plurality of first grooves spaced apart from each other;
a second plate coupled to the first plate, the second plate defining a plurality of second grooves spaced apart from each other, wherein each of the first grooves overlaps with a respective one of the plurality of second grooves to form a pockets; and
a plurality of elongated members, each disposed in one of the pockets, and each of the elongated members having first and second curved ends and an elongated shaft extending therebetween.

2. The clutch actuation device of claim 1, wherein each of the first and second grooves are ramped grooves that include a deep end portion, a shallow end portion, and a ramped surface therebetween.

3. The clutch actuation device of claim 2, wherein the first and second plates are configured to be selectively spaced apart from each other in a compressed state and an extended state.

4. The clutch actuation device of claim 3, wherein the elongated shaft of each elongated member is parallel to the ramped surfaces of the ramped grooves of a respective one of the pockets when the first and second plates are in the compressed state.

5. The clutch actuation device of claim 3, wherein the elongated shaft of each of the elongated members is transverse to the ramped surfaces of the ramped grooves of a respective one of the pockets when the first and second plates are in the extended state.

6. The clutch actuation device of claim 3, wherein the ramped surfaces of the ramped grooves are spaced apart from each other by a first distance in the compressed state and a second distance in the extended state, and the second distance is greater than the first distance.

7. The clutch actuation device of claim 3, wherein the ramped grooves are situated with respect to each other in a first rotational configuration in the compressed state and a second rotational configuration in the extended state, and the first and second rotational configurations are offset from each other by an offset angle.

8. The clutch actuation device of claim 1 further comprising third and fourth elongated members disposed within third and fourth pockets, respectively.

9. A clutch actuation device comprising:
a first plate defining a first plurality of ramped grooves spaced apart from one another and each having a deep end portion, a shallow end portion, and a ramped surface therebetween;
a second plate coupled to the first plate, the second plate defining a second plurality of ramped grooves spaced apart from one another and each having a deep end portion, a shallow end portion, and a ramped surface therebetween, the first and second plates being selectively spaced apart from each other in a compressed state and an extended state; and
a plurality of elongated members disposed between the first and second plates, each elongated member contacting one of the deep end portions of the first plurality of ramped grooves and one of the deep end portions of the second plurality of ramped grooves while the first and second plates are in the compressed and extended states;
wherein each elongated member has first and second curved ends and an elongated shaft extending therebetween.

10. The clutch actuation device of claim 9, wherein each of the elongated shafts is generally parallel to one of the ramped surfaces of the first and second plurality of ramped grooves when the first and second plates are in the compressed state.

11. The clutch actuation device of claim 9, wherein each of the elongated shafts is generally transverse to one of the ramped surfaces of the first and second plurality of ramped grooves when the first and second plates are in the extended state.

12. The clutch actuation device of claim 9, wherein each of the elongated shafts contacts at least one of the ramped surfaces of the first and second plurality of ramped grooves when the first and second plates are in the compressed state.

13. The clutch actuation device of claim 9, wherein each of the elongated shafts is spaced apart from and angularly offset from one of the ramped surfaces of the first and second plurality of ramped grooves when the first and second plates are in the extended state.

14. The clutch actuation device of claim 9, wherein each of the elongated shafts includes a longitudinal axis, each of the longitudinal axes extends from the first plate by a first angle when the first and second plates are in the compressed state, and each of the longitudinal axes extends from the first plate by a second angle when the first and second plates are in the extended state, wherein the first and second angles differ.

15. A clutch actuation device comprising:
a first plate defining a plurality of first grooves spaced apart from one another, each of the plurality of first grooves including a first ramped groove having a deep end portion, a shallow end portion, and a ramped surface therebetween; and
a second plate defining a plurality of second grooves spaced apart from one another, the plurality of second grooves including a second ramped groove having a deep end portion, a shallow end portion, and a ramped surface therebetween and each of the plurality of second grooves corresponding to one of the first grooves to form a pair of ramped grooves, each pair of ramped grooves generally overlapping to define a pocket, for each of the pockets, the deep end portion of the first ramped groove is aligned closer to the shallow end portion of the second ramped groove than the deep end portion of the second ramped groove.

16. The clutch actuation device of claim 15, wherein the first and second plates are configured to be spaced apart from each other in a compressed state and an extended state, and for each of the pockets, the first ramped groove is situated with respect to the second ramped groove in (i) a first rotational configuration when the first and second plates are in the compressed state, and (ii) a second rotational configuration when the first and second plates are in the extended state.

17. The clutch actuation device of claim 16, wherein the first and second rotational configurations are offset from each other by an offset angle.

18. The clutch actuation device of claim 15, wherein the first and second plates are configured to be spaced apart from each other in a compressed state and an extended state, and for each of the pockets, the deep end portion of the first ramped groove is separated from the deep end portion of the second ramped groove (i) by a first distance when the first and second plates are in the compressed state and (ii) by a second distance when the first and second plates are in the extended state, and the second distance is less than the first distance.

19. The clutch actuation device of claim 15, wherein each of the pockets is configured to receive an elongated member.

* * * * *

UNITED STATES PATENT AND TRADEMARK OFFICE
CERTIFICATE OF CORRECTION

PATENT NO. : 10,006,501 B2
APPLICATION NO. : 14/963748
DATED : June 26, 2018
INVENTOR(S) : Carr Page 1 of 1

It is certified that error appears in the above-identified patent and that said Letters Patent is hereby corrected as shown below:

In the Claims

Column 7, Line 36, Claim 1:
After "grooves to form a"
Delete "pockets" and
Insert -- pocket --.

Signed and Sealed this
Twenty-second Day of January, 2019

Andrei Iancu
*Director of the United States Patent and Trademark Office*